United States Patent [19]
Buthe et al.

[11] 3,800,558
[45] Apr. 2, 1974

[54] TELESCOPING DRIVE SHAFT

[75] Inventors: Theo Buthe; Hubert Geisthoff, both of Lohmar, Germany

[73] Assignee: Jean Walterscheild GmbH, Trier, Germany

[22] Filed: Apr. 10, 1972

[21] Appl. No.: 242,332

[30] Foreign Application Priority Data
Dec. 24, 1971  Germany............................ 2164543

[52] U.S. Cl................................. 64/23.7, 308/6 C
[51] Int. Cl............................................... F16d 3/06
[58] Field of Search ....... 64/23.7, 23 R; 287/58 CT; 308/6 C, 185 R

[56] References Cited
UNITED STATES PATENTS

| | | | |
|---|---|---|---|
| 2,503,009 | 4/1950 | Thompson ............................ | 308/6 |
| 3,552,806 | 1/1971 | Weasler et al. ....................... | 308/6 |
| 3,318,109 | 5/1967 | Ressler et al. ....................... | 308/6 C |
| 2,225,929 | 12/1940 | Sarazin ................................. | 64/23 |
| 2,908,152 | 10/1959 | Anderson ............................. | 64/23 |
| 3,673,817 | 7/1972 | Doran et al. ......................... | 64/23.7 |

*Primary Examiner*—Benjamin W. Wyche
*Assistant Examiner*—Randall Heald
*Attorney, Agent, or Firm*—Edmund M. Jaskiewicz

[57] ABSTRACT

In a telescoping drive shaft the square end portion of an inner shaft is telescopingly positioned within the hollow end of an outer shaft so that there is relative axial displacement therebetween. An endless series of anti-friction balls is positioned on each face of the inner shaft with each series comprising a pair of parallel straight sections of balls connected at their ends by semi-circular sections of balls. A tubular ball retainer positioned between the shafts has longitudinal slots in which the straight sections of balls are disposed. The widths of these slots are less than the diameters of the balls. Semi-circular tubular guides are positioned on the end portions of the ball retainer at the ends of the longitudinal slots to accommodate the semi-circular ball sections so that these sections of balls ride on the end portions of the ball retainers which form the bottoms of the tubular guides. Inclined surfaces are provided at the ends of the longitudinal slots to define transitions for the balls as they pass between the slots and the bottom surfaces of the tubular guides.

10 Claims, 9 Drawing Figures

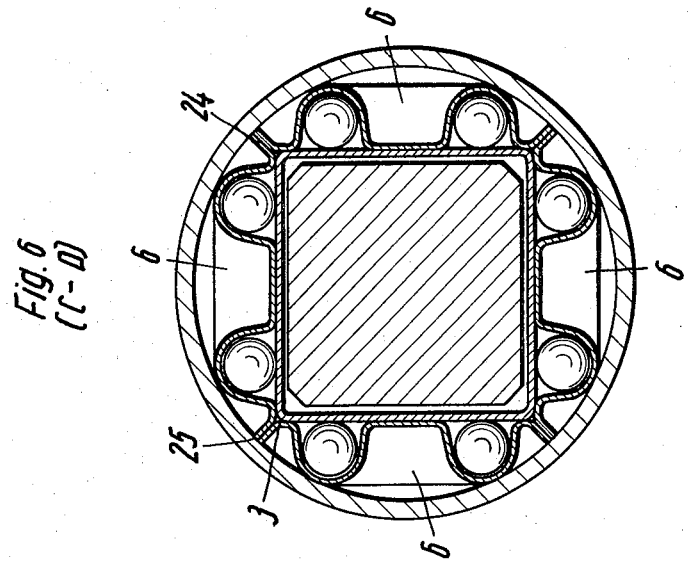
Fig.6 (C-D)
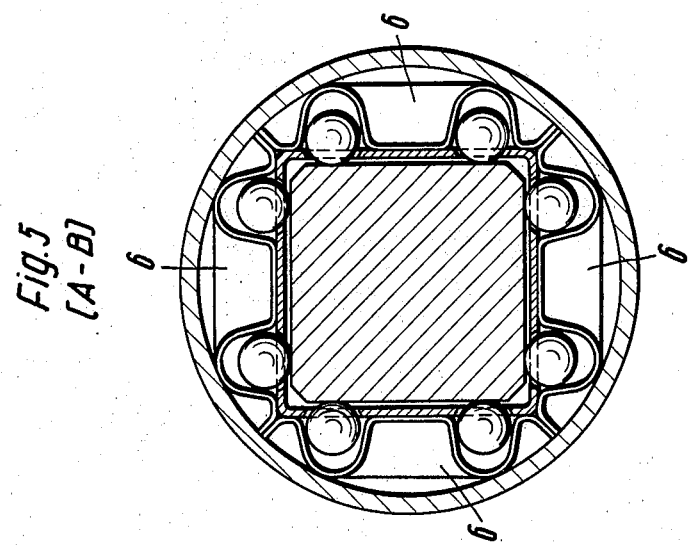
Fig.5 (A-B)

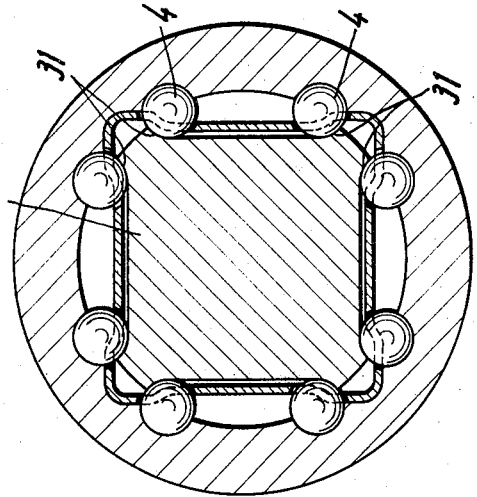
Fig.8
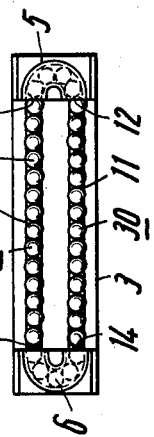
Fig.9
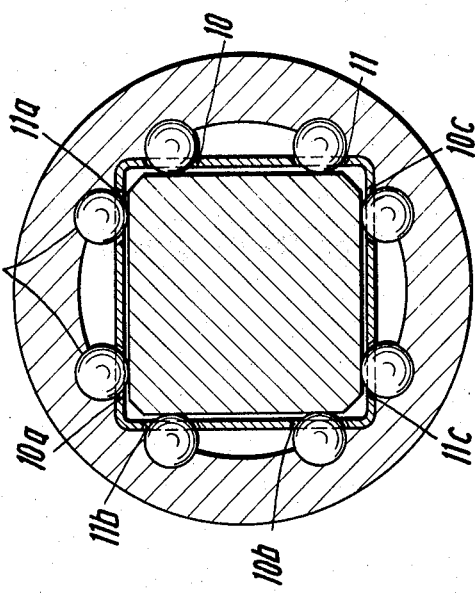
Fig.7 (E-F)

TELESCOPING DRIVE SHAFT

The present invention relates to an anti-friction telescoping drive shaft, more particularly, to the structure for retaining the balls in anti-friction relationship between the peripheral faces of the inner shaft and the inner face of the outer shaft.

It is known to construct a telescoping drive shaft by inserting an inner shaft having a polygonal cross-section in a tubular outer shaft for relative axial displacement therebetween. Anti-friction balls are positioned between each of the peripheral faces of the inner shaft and the outer shaft. The balls may be disposed in an endless series consisting of two straight sections that are parallel to each other and to the axis of the shaft and are connected to their ends by semi-circular sections of balls. These balls are guided by some form of a ball retainer member and are utilized for the transmission of torque between the shafts. In actual practice, the balls in the straight sections of the endless series are employed for the transmission of torque, or do not transmit any torque, depending on the direction of rotation of the shaft. The balls disposed in the end semi-circular curve sections do not transmit any load at all.

In such telescoping drive shafts, the hollow outer shaft has been provided with longitudinal grooves having a relatively great width. The balls are located at the edges of the grooves by a retainer member which is mounted in the free central portion of each groove. Suitably curved recesses are provided on the longitudinal edges of the ball retainer to retain the balls in position while at the same time enabling the balls to have a small range of movement. At each end, the ball retainer is provided with a curved semi-circular shape. A component having a semi-circular groove therein and mounted on a flange is inserted into each of the grooves and thus limits the semi-circular or reversal movement of the balls in each series of balls. In addition, a recess or depression may be formed in the groove base or cover within the semi-circular end area in order to relieve the balls from any load while they are in their semi-circular shape. Such a structure is disclosed in German patent 1,525,197.

However, this known structure has the disadvantage that satisfactory operation of the drive shaft is largely dependent on achieving precise and accurate tolerances during manufacturing. Only one edge of a groove is tangent to a straight section of balls. The width of each groove and that of the ball retainer must be fabricated according to exceedingly small tolerances. The same high degree of accuracy must also be present for the length of the ball retainer and the assembled position of the cover in order to prevent the balls from dropping out. Considerable difficulties are encountered in adhering to the small dimensional tolerances since four structural components (two covers, the outer shaft and ball retainer) for each endless series of balls must have a precise position with respect to each other in order to satisfy all operating requirements of the shaft. The necessity for correlating these four structural components precisely for satisfactory operation of the drive shaft is further compounded by the accumulation of errors or dimensional tolerances in the individual components.

There is the further disadvantage that there is a curved guide through only one side of the ball retainer. This means that the free distance between the ball retainer and the edge of the groove is relatively large. In order to maintain the ball securely, the ball retainer must be able to compensate or adjust for manufacturing tolerances in four directions (the directions toward the two straight sections of balls and the directions to the two semi-circular reversing sections of balls of each series). The ball retainer can accomplish this compensation only where the components are manufactured to very small tolerances.

In addition, the securing of the ball retainer introduces problems since the retainer must be aligned precisely in the interior of the outer shaft. Some form of centering structure is usually provided and holes are generally drilled to secure the fastening means for the ball retainer.

Another disadvantage of known telescoping drive shafts is that the ball retainer functions to transmit a portion of the total forces transmitted by the shaft. Accordingly, the ball retainer must be of sufficient construction so as to be able to withstand transmission forces which further introduces difficulties and added expenses in the manufacturing process. Also, precise centering structure is required in order to secure strongly the ball retainer to enable the retainer to transmit or withstand that portion of the torque acting upon the retainer.

Expensive and complicated manufacturing operations are required in order to relieve the load or transmitted force from the semi-circular sections of balls in which the directions of movement of the balls are reversed. This is true because depressions or recesses must be provided in the base of the groove to remove transmitted forces from semi-circular sections of balls and this operation for forming the recesses must be carried out in a relatively small space within the outer shaft. A complicated and expensive manufacturing operation is also involved in that construction of a telescoping drive shaft where semi-circular grooves are provided in the cover and then disposed around the inner shaft upon assembly of the cover.

It is therefore the principal object of the present invention to provide a novel and improved telescoping drive shaft.

It is another object of the present invention to provide a simple but effective structure which can be readily and inexpensively manufactured for accurately retaining the balls in rolling engagement between the inner and outer shafts of a telescoping drive shaft.

It is a further object of the present invention to provide a telescoping drive shaft wherein the ball retainer is substantially free of any of the torque transmitted between the slidingly connected shafts.

It is an additional object of the present invention to provide a telescoping drive shaft having an improved ball retainer wherein the balls will not drop from their guide grooves upon disengagement of the inner and outer shafts.

It is still another object of the present invention to provide a telescoping drive shaft having an endless series of balls on each of the peripheral faces of the inner shaft which eliminates any damage to the balls when they are in the reversal portion of a series.

The objects of the present invention are attained and the disadvantages of known drive shafts as described above are eliminated by the present invention which essentially comprises an inner shaft having a polygonal cross section to define a plurality of peripheral faces and a tubular outer shaft telescopingly positioned over the inner shaft for relative axial movement therebetween. An endless series of balls is disposed on each face of the inner shaft and in rolling engagement with the inner face of the outer shaft. Each series comprises two straight sections of balls parallel to each other and to the axis of the shaft and connected at their ends by two semi-circular sections of balls. The inner face of the outer shaft may be provided with grooves to receive the straight sections of balls. A tubular ball retainer is between the inner and outer shafts and has a plurality of longitudinal slots corresponding approximately in length to the straight sections of balls which are received by these slots. Semi-circular tubular guides connect the ends of each pair of longitudinal slots and are positioned on the end portions of the retainer outwardly of the longitudinal slots. The width of the longitudinal slots is less than the diameter of the balls so that the balls are disposed between the retainer and the outer shaft. A transition which may be in the form of an inclined surface is provided between the ends of the longitudinal slots and the end portions of the retainer upon which the semi-circular tubular guides rest to facilitate movement of the balls between the straight and semi-circular sections.

The semi-circular tubular guides are each structurally independent of the ball retainer and are retained in axial position by flange members or the like positioned between the shafts at the ends of the ball retainer member.

As a result of this invention there is provided a ball retainer which consists of a single structural element in place of the previously known attachment of bars or other elements. In addition, the balls are guided in a closed passage or tunnel so that the balls in the reversal or semi-circular sections do not contact the inner shaft. Since the bottoms of the semi-circular end guides are formed by end portions of the ball retainer, the retainer is provided with slots only along the straight sections of the endless series of balls. Since the width of the longitudinal slots are less than the diameters of the balls the balls are retained between the retainer and the inner face of the outer shaft. Therefore, when the inner shaft is withdrawn to disassemble the drive shaft the balls will not drop from the retainer and will remain in position so as to facilitate reinsertion of the inner shaft. The insertion of the inner shaft is further facilitated by providing a bevel or chamfer on the extreme end of the shaft so that this bevel will cam the balls outwardly and thus prevent the inner shaft end from impacting the balls and damaging them.

The cost of manufacturing the tubular ball retainer member according to the present invention is considerably reduced since the manufacturing process essentially comprises punching straight longitudinal slots into the walls of a tube having a square or other polygonal cross section.

The telescoping drive shaft of the present invention presents considerable advantages over previously known telescoping drive shafts having ball bearings and provided with U-shaped grooves on the inner shaft part so that these U-shaped grooves together with U-shaped guides reverse the direction of movement of the straight sections of an endless series of balls. This necessitated providing a ball retainer with curved ends on each peripheral face of a polygonal inner shaft. This was a difficult operation in manufacture and assembly and incurred relatively high costs. The ball retainers were threadedly attached to the tubular shaft part and threaded fastening structures had to be provided in addition to a reliable locking arrangement. The result was a telescoping drive shaft having a large number of individual parts which presented considerable difficulty in both assembly and manufacture. The smaller number of parts in the telescoping drive shaft of the present invention, significantly reduces the maintenance of such a drive shaft.

Other objects and advantages of the present invention will be apparent upon reference to the accompanying description when taken in conjunction with the following drawings, which are exemplary, wherein;

FIG. 5 is a sectional view taken along the line A–B of FIG. 3;

FIG. 6 is a sectional view taken along the line C–D of FIG. 3;

FIG. 7 is a sectional view taken along the line E–F of FIG. 3;

FIG. 8 is a sectional view similar to that of FIG. 7 but disclosing a modification wherein the inner shaft is provided with guide grooves; and FIG. 9 is a plan view of one face of the ball retainer showing the semi-circular tubular guides in position.

Preceeding next to the drawings wherein like reference symbols indicate the same parts throughout the various views a specific embodiment and modifications of the present invention will be described in detail.

Figure 1:
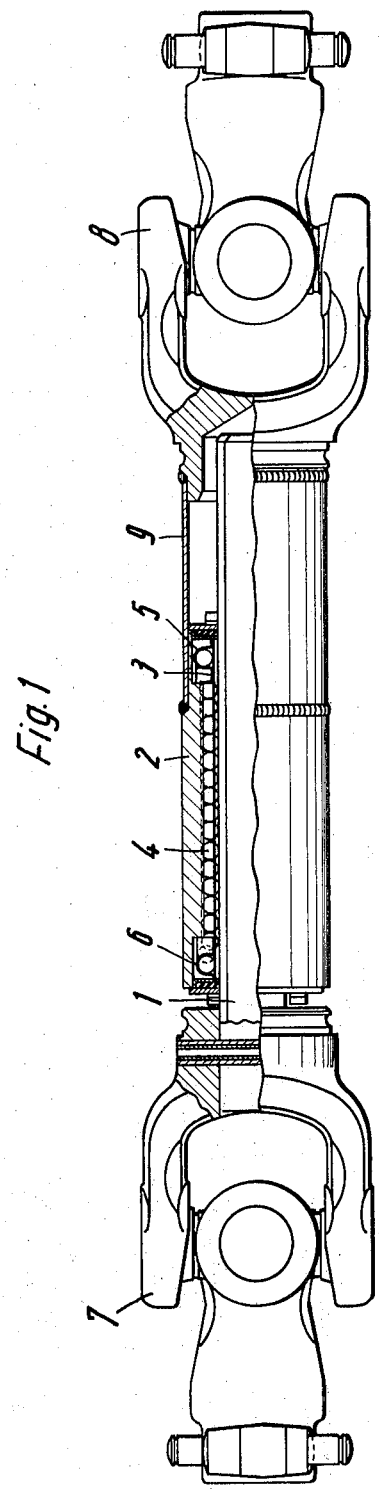
FIG. 1 is an elevational view, partially in longitudinal section, of a universal jointed shaft incorporating the telescoping drive shaft of the present invention.
Figure 2:
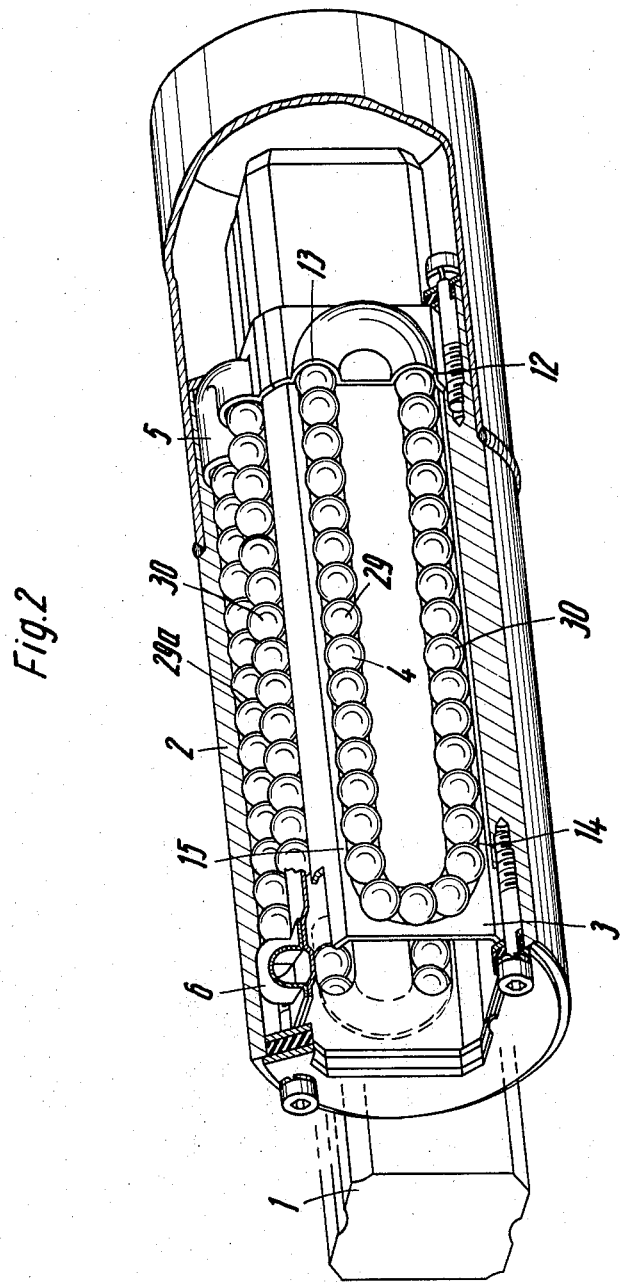
FIG. 2 is a perspective view of the telescoping drive shaft portion of the shaft of FIG. 1 with parts of the outer shaft being removed to show details of construction.

In FIG. 1 there is illustrated a telescoping drive shaft incorporating the present invention and comprising an inner shaft 1 slideably positioned within an outer shaft 2 so as to be axially displaceable therein.

A ball retainer 3 is disposed between shafts 1 and 2 and retains a plurality of anti-friction balls 4 for transmission of torque between shafts 1 and 2. The balls are arranged in an endless series as illustrated in FIG. 9 and comprise two straight sections 29 and 30 which are parallel to each other and parallel to the axis of the shaft. The ends of the straight sections of balls are mutually inner-connected by reversal or semi-circular sections of balls which travel within semi-circular or reversal tubular guides 5 and 6. A tubular extension 9 of any suitable length may be attached to the outer shaft 2. Inner shaft 1 and outer shaft 2, or tubular extension 9, are connected respectively to Cardan forks or yokes 7 and 8.

The ball retainer 3 comprises a tubular structural element having a cross section corresponding to the cross-sectional configuration of the inner shaft 1 which in this embodiment is a square. The retainer member thus has four peripheral faces with each peripheral face being provided with two longitudinal slots 10 and 11, 10a and 11a, 10b and 11b and 10c and 11c, respectively, The slots are located adjacent the edges or corners of the inner shaft 1 and have a width which is less than the diameter of the balls 4. The length of each longitudinal slot corresponds approximately to the length of the straight ball sections 29 and 30.

The ends of slots 10 and 11 are connected at 12 and 13 and 14 and 15 by tubular guides 5 and 6 which are in the shape of a semi-circle so as to provide for a reversal of direction of the balls of the straight sections. The tubular guides 5 and 6 are structurally independent from the retainer member 3 and actually rest upon end portions 32 of the ball retainer member which extend outwardly of the ends of the longitudinal slots 10 and 11. Thus, the end portions 32 define the bottoms of the tubular guides 5 and 6. The cross sectional area within the tubular guides 5 and 6 is greater than that of the balls 4 so that the balls may readily roll through the tubular guides upon the retainer end portions. 32.

Figure 3:
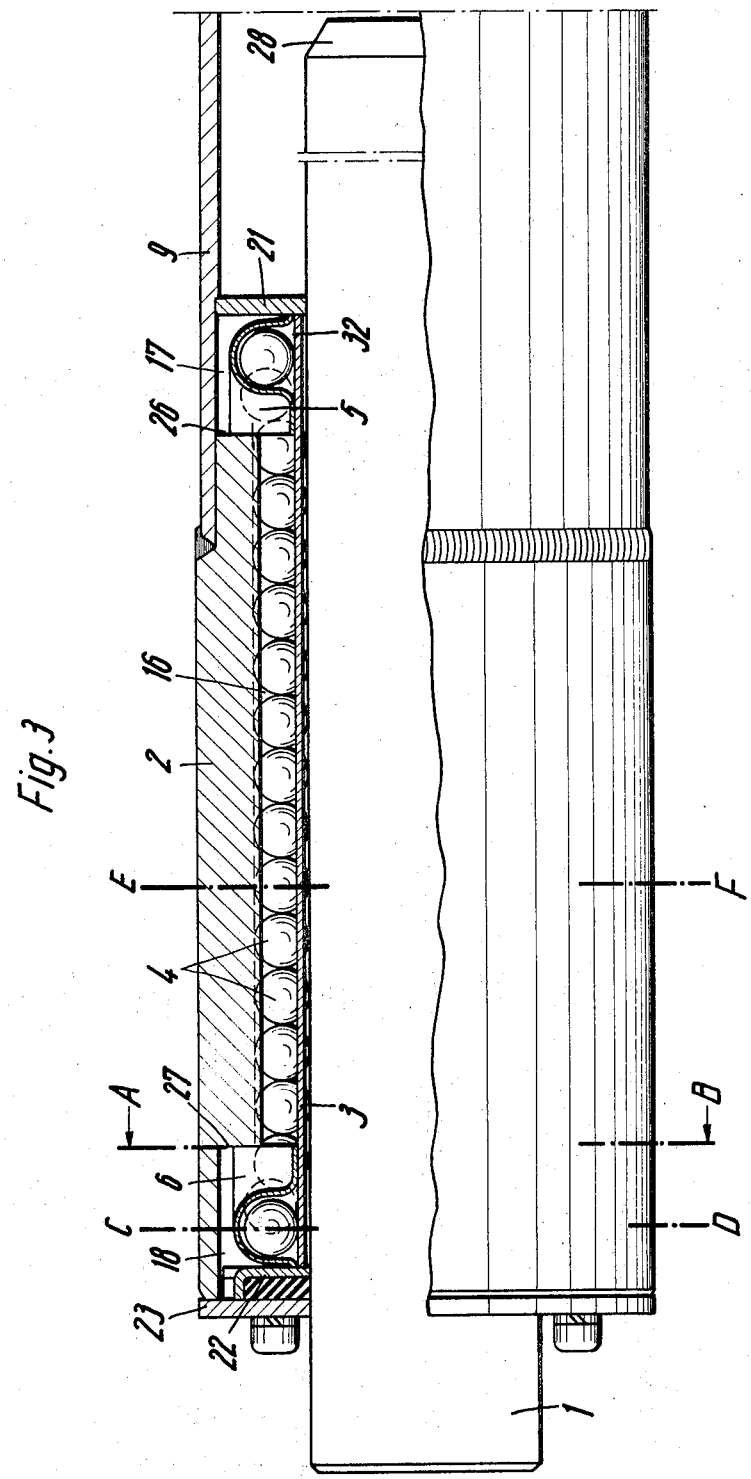
FIG. 3 is an elevational view in enlarged scale of the telescoping drive shaft portion of shaft of FIG. 1 and a portion being shown in longitudinal section.
Figure 4:
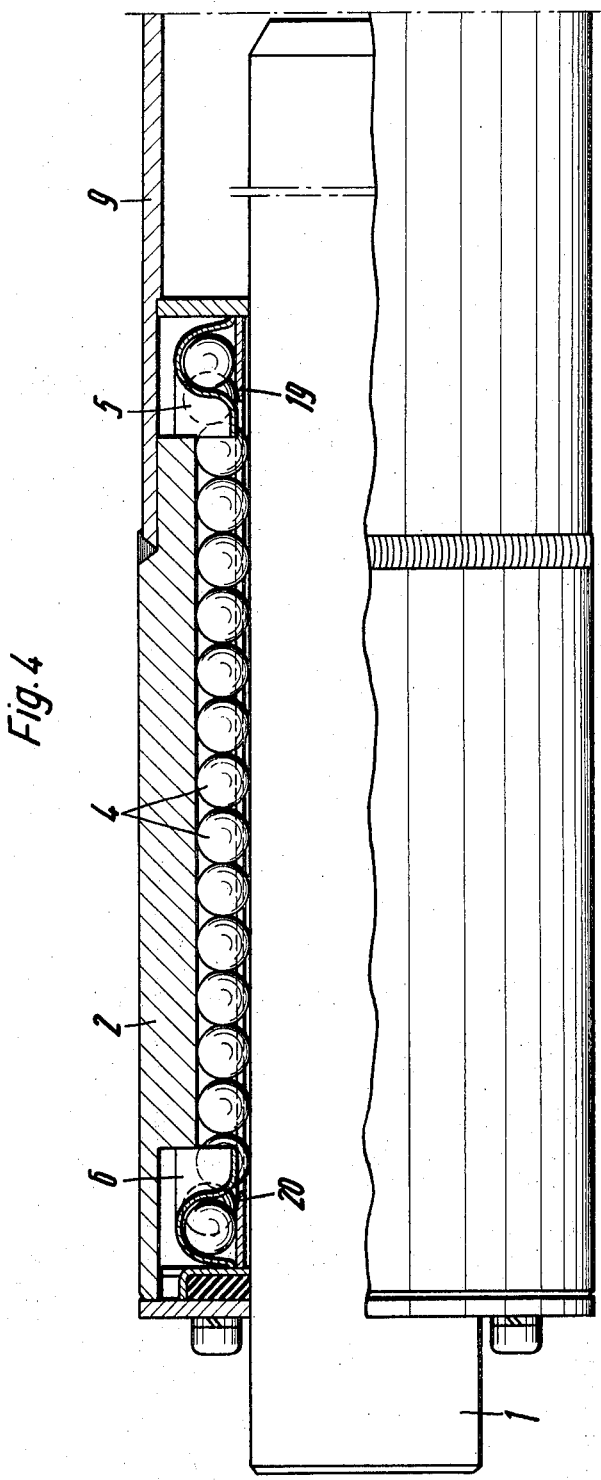
FIG. 4 is a view similar to that of FIG. 3 but with the longitudinal section taken in the plane of the guide slots.

The inner face of the outer shaft 2 is provided with longitudinally extend-ing grooves 16 which may be seen in FIGS.3 and 7 and whose length corresponds to the length of the longitudinal slots 10 and 11 so as to accommodate the straight sections 29 and 30 of the endless series of balls. Each endless series of balls is thus retained between the ball retaining member 3 and the outer shaft since the balls cannot pass through the retainer longitudinal slots 10 and 11 because of the widths relationship.

The outer shaft 2 is provided with enlarged diameter portions at the ends of the grooves 16 so as to define recesses 17 and 18 in which are positioned the tubular guides 5 and 6.

Inclined surfaces 19 and 20 are provided at the ends of the slots 10 and 11 so as to form a transition as the balls pass from the longitudinal slots of the ball retainer member into the tubular guides. The relationships of the balls are shown in FIGS. 5 and 6.

The ball retainer 3 is positioned axially between a cross piece 21 which may be in the form of a web or strap and a flange 23 and a ring 22 positioned at the open end of the outer shaft. The tubular guides 5 and 6 are both provided with lateral extensions 24 and 25 (FIG. 6) which extend outwardly at 45 with respect to the outer surface of the ball retainer member 3 and their narrow ends engage the faces 26 and 27 of recesses 17 and 18. The other narrow ends of the lateral extensions 24 and 25 are positioned against cross piece 21 and flange 23 or ring 22.

The end of inner shaft 1 has a beveled or chamfered edge 28 so as to perform a camming function when this beveled end engages the balls 4 upon the insertion of the inner shaft 1 into the outer shaft 2. This camming action thus prevents any impact stressing or damage of the balls 4 during this insertion process.

Depending on the direction of rotation of the drive shaft, either straight section 29 or 29a of balls 4 on each peripheral face of inner shaft part 1 will be subjected to a load produced by the transmission of forces while the other straight section 30 or 30a on each face is relieved of any load. When inner and outer shafts 1 and 2 are axially displaced in telescoping relationship with respect to each other, balls 4 of straight sections 29 or 30 subjected to load will then roll through tubular guide 5 or 6 depending on the direction of rotation and then continue on into the other straight section 30 or 29 which is not subjected to load.

In the modification of FIG. 8, the inner shaft 1 is provided with longitudinally extending grooves 31 for receiving the balls 4. These grooves 31 have a width approximately equal to the lateral distance between the straight sections of balls of a series and thus a line contact of the balls 4 is produced only along the edges of the grooves. This results in a more favorable surface pressure. The radius of curvature of the grooves 31 is slightly greater than that of the balls 4 so that a good line contact of balls under torque is obtained. This line contact of the balls with the inner shaft accordingly results in a clinging or attachment of the balls on the grooves under torque.

It is pointed out that since the ball retainer 3 has a square cross section conforming to the square cross section of inner shaft 1 while the outer shaft 2 possesses a circular tubular cross section with inner longitudinal grooves 16, it is apparent that the ball retainer 3 comprises a single structural member which is essentially a tube having a square cross section with straight longitudinal slots punched in the walls thereof. Thus, the entire assembly of the telescoping drive shaft according to the present invention, has a relatively small number of parts that can be fabricated without incurring large manufacturing expense. The assembly and disassembly of the telescoping shaft can also be carried out in a simple manner since withdraw of the inner shaft will not cause the balls to fall from the shaft because the balls are retained between the ball retainer 3 and the outer shaft 2.

It will be understood that this invention is susceptible to modification in order to adapt it to different usages and conditions, and accordingly, it is desired to comprehend such modifications within this invention as may fall within the scope of appended claims.

What is claimed is:

1. A telescoping drive shaft comprising an inner shaft having a polygonal cross-section to define a plurality of peripheral faces, a tubular outer shaft telescopingly positioned over said inner shaft for relative axial movement therebetween, an endless series of balls on each face of said inner shaft and each series comprising two straight sections of balls parallel to each other and to the axis of the shaft and connected at their ends by two semi-circular sections of balls, the straight sections of each series of balls being in rolling engagement with both shafts, for the transmission of torque therebetween, a tubular ball retainer between said inner and outer shafts and having a plurality of straight longitudinal slots corresponding approximately in length to the straight sections of said endless series, semi-circular tubular guides connecting the ends of each pair of longitudinal slots and positioned on the end portions of said retainer outwardly of said longitudinal slots, the width of said longitudinal slots being less than the diameter of the balls so that the balls are disposed between said retainer and said outer shaft.

2. A telescoping drive shaft as claimed in claim 1, and comprising transition means between the ends of said longitudinal slots and the retainer end portions for facilitating the rolling of the balls between said slots and tubular guides.

3. A telescoping drive shaft as claimed in claim 2 wherein said transition means comprises an inclined surface to said retainer end portions defining the bottoms of said tubular guides.

4. A telescoping drive shaft as claimed in claim 1 wherein the end of the inner shaft has a beveled edge thereon to facilitate insertion of said inner shaft into the ball retainer within the outer shaft.

5. A telescoping drive shaft as claimed in claim 1 wherein there are grooves in the faces of said inner shaft for said balls.

6. A telescoping drive shaft as claimed in claim 5 wherein the radius of curvature of said grooves is slightly greater than that of the balls.

7. A telescoping drive shaft as claimed in claim 1 wherein said tubular guides each are structurally independent from said ball retainer and are positioned on said ball retainer end portions, an annular flange member secured to the open end of said outer shaft around said inner shaft and contacting one of said tubular guides and said ball retainer to maintain said guide and retainer in position.

8. A telescoping drive shaft as claimed in claim 1 wherein portions of the inner diameter of said outer shaft are enlarged to accommodate said tubular guides.

9. A telescoping drive shaft as claimed in claim 1 wherein said tubular ball retainer has a cross-section conforming to that of said inner shaft, said outer shaft having a circular cross-section.

10. A telescoping drive shaft as claimed in claim 1 wherein the cross section of said inner shaft is square.

* * * * *